Sept. 23, 1941.  C. SEAMAN  2,256,792
APPARATUS FOR MAKING TRIMMINGS
Filed June 25, 1938  5 Sheets-Sheet 1
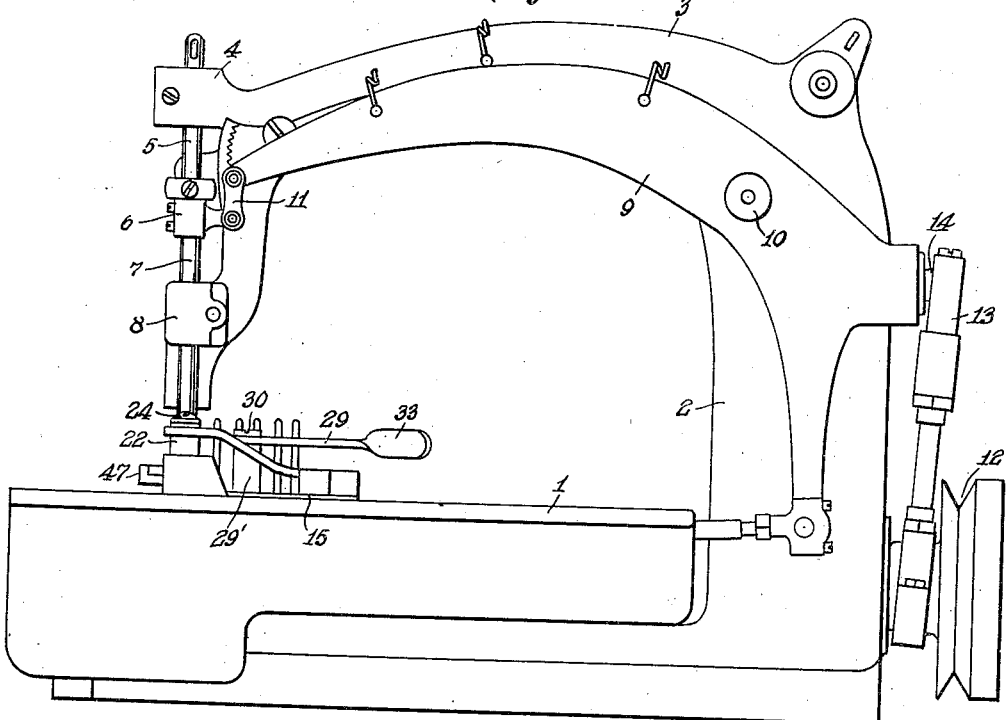
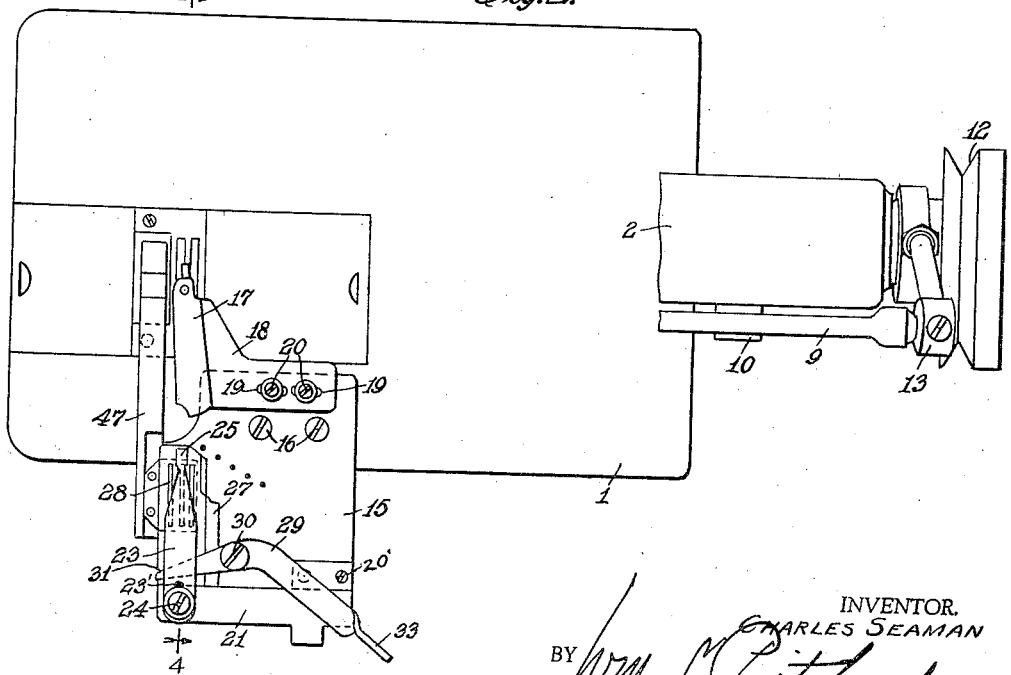
INVENTOR.
CHARLES SEAMAN
BY Wm. S. Pritchard
ATTORNEY.

Sept. 23, 1941.  C. SEAMAN  2,256,792
APPARATUS FOR MAKING TRIMMINGS
Filed June 25, 1938  5 Sheets-Sheet 2
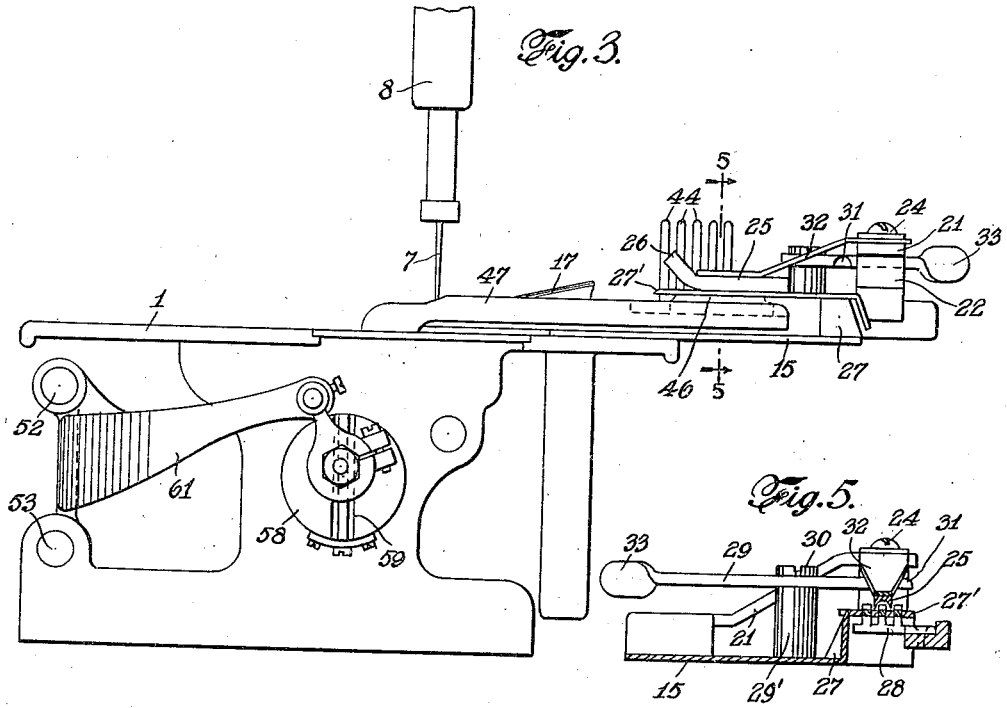
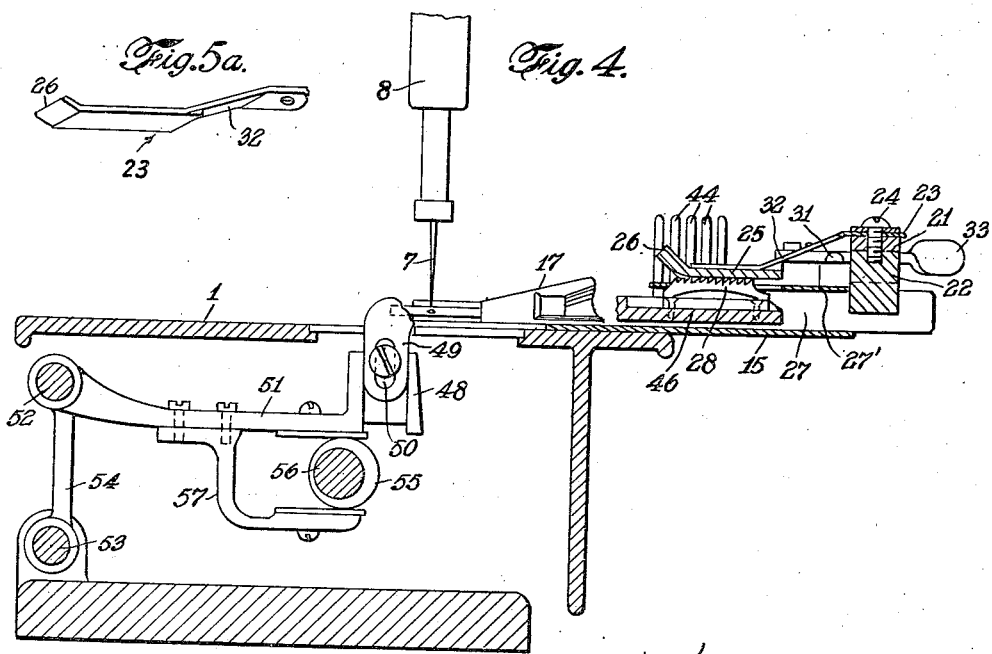
INVENTOR.
CHARLES SEAMAN
BY
ATTORNEY.

Sept. 23, 1941.　　　C. SEAMAN　　　2,256,792
APPARATUS FOR MAKING TRIMMINGS
Filed June 25, 1938　　　5 Sheets-Sheet 3
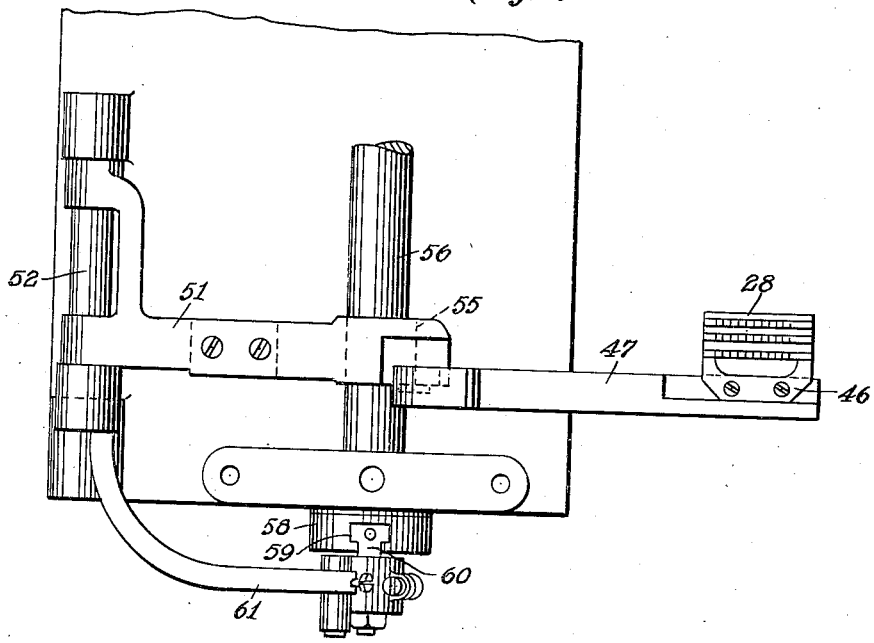
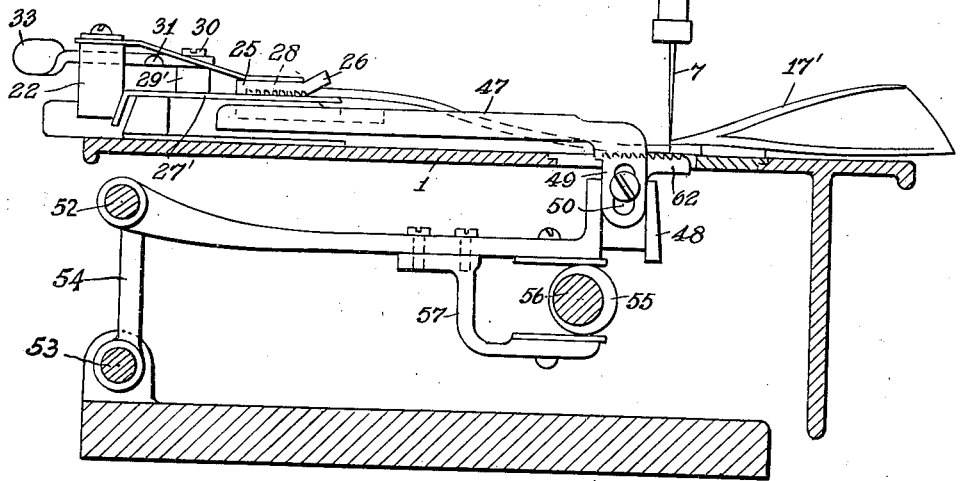
INVENTOR.
CHARLES SEAMAN
BY Wm. J. Pritchard
ATTORNEY.

Sept. 23, 1941.   C. SEAMAN   2,256,792
APPARATUS FOR MAKING TRIMMINGS
Filed June 25, 1938   5 Sheets-Sheet 4

INVENTOR.
CHARLES SEAMAN
BY Wm. S. Pritchard
ATTORNEY.

Sept. 23, 1941.　　　C. SEAMAN　　　2,256,792
APPARATUS FOR MAKING TRIMMINGS
Filed June 25, 1938　　　5 Sheets-Sheet 5
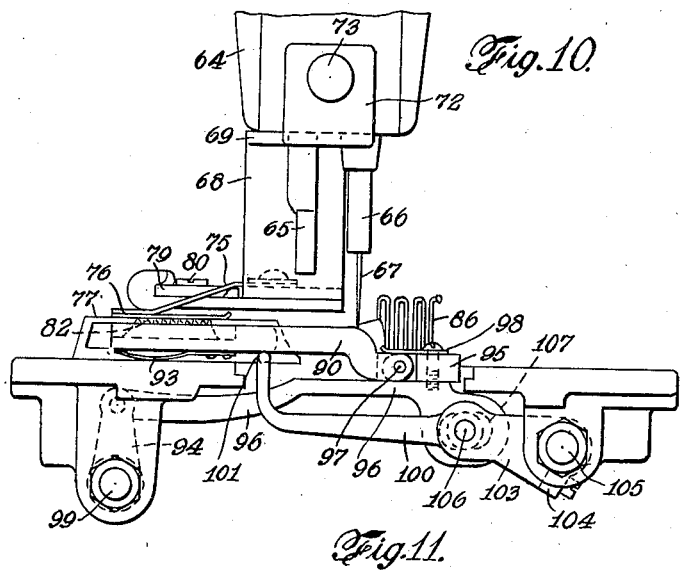
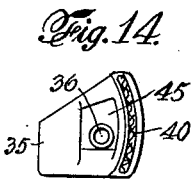
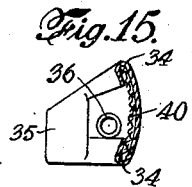
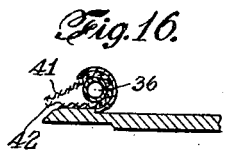
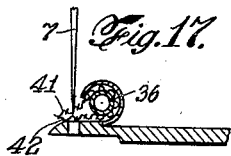
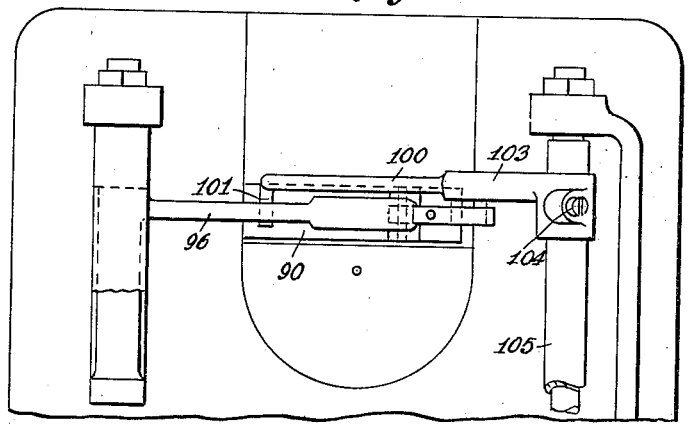
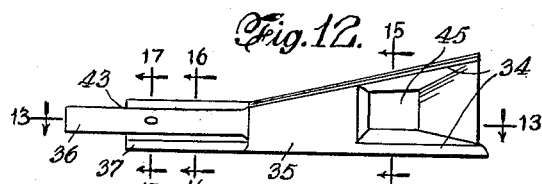
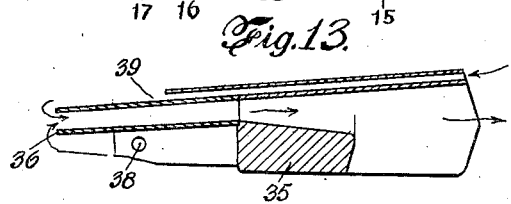
INVENTOR.
CHARLES SEAMAN
BY 
ATTORNEY.

Patented Sept. 23, 1941

2,256,792

UNITED STATES PATENT OFFICE 2,256,792

APPARATUS FOR MAKING TRIMMINGS

Charles Seaman, Jamaica Estates, N. Y.

Application June 25, 1938, Serial No. 215,724

12 Claims. (Cl. 112—63)

This invention relates to sewing machines for making a trimming and to the method of making the same. More particularly, this invention relates to a sewing machine attachment for making trimmings and to the method of producing the same.

The nature and objects of the instant invention will become apparent from the following description, appended claims, and accompanying drawings in which:

Figure 1 is a front elevation of a machine head having attached thereto an embodiment of an attachment constituting the invention;

Figure 2 is a top plan view of the apparatus shown in Figure 1, with the machine head omitted to more clearly show the attachment;

Figure 3 is an end view looking toward the left in Figure 1;

Figure 4 is a section taken on the line 4—4 of Figure 2;

Figure 5 is a section taken on the line 5—5 of Figure 3;

Figure 5a is a perspective view of a modified form of presser foot;

Figure 6 is a fragmentary plan view showing the feed dog mechanism;

Figure 7 is a section of the modified form of the invention shown in Figure 4;

Figure 7a is a detail showing the manner in which the trimming is folded and stitched by the embodiment shown in Figure 7;

Figure 10 is an end view looking to the left of Figure 8;

Figure 11 is a bottom view of the apparatus shown in Figure 10;

Figure 12 is a front elevation of a folder constituting a part of the invention;

Figure 13 is a section taken on the line 13—13 of Figure 12;

Figure 14 is an end view of the folder showing the feed end thereof; and

Figure 9:
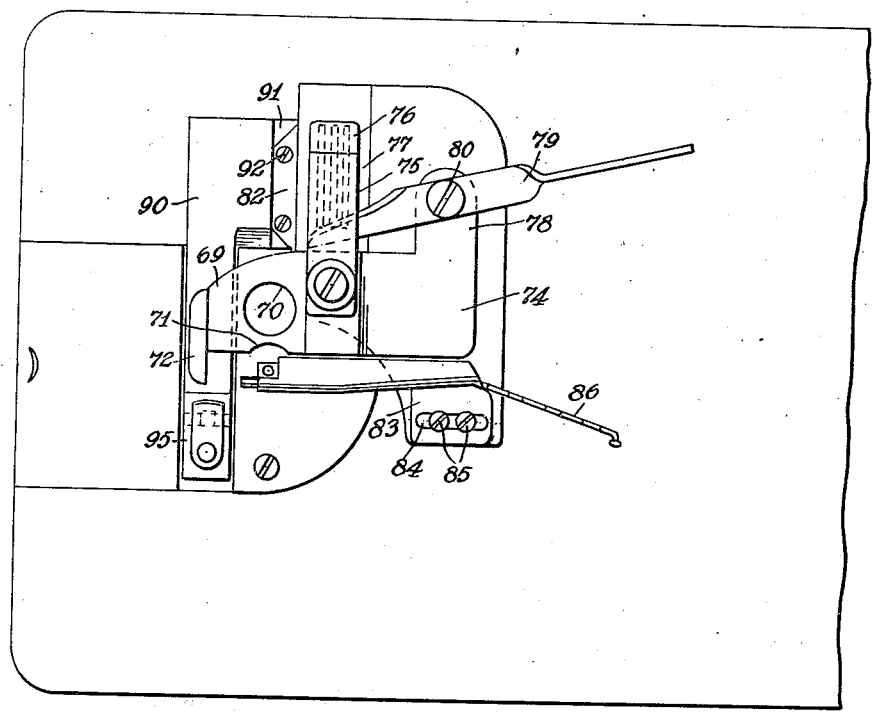
Figure 9 is a top plan view of the attachment shown in Figure 8.

Figures 15, 16 and 17 are sections taken on the lines 15—15, 16—16 and 17—17 respectively of Figure 12.

In accordance with the principles of the instant invention and in one embodiment thereof, a strip of the material which is to constitute the trimming is folded about its longitudinal axis so that the opposite longitudinal edges are substantially in superposed relationship and, while in this condition, is stitched by means of a needle passing through the material adjacent the superposed edges. After the stitching, the material is preferably turned inside out so that the free edges are positioned on the interior of the product.

In the foregoing method, the material is automatically and positively threaded to and through the stations where each of the manipulative steps is performed without the aid of any manual operation whatsoever, except appropriately threading the trimming through the machine at the beginning of the operation. In other words, after the material has been threaded through the machine, it is unnecessary to manually pull the material through the machine, as is the case with materials operated on by the usual sewing machines.

In the form of the invention immediately before described, the material, during the folding and stitching operation, is fed away from the operator. When the material is turned inside out, it is fed toward the operator.

In another form of the invention, the material is fed away from the operator throughout the course of its manufacture.

The apparatus constituting another phase of this invention comprises a conventional sewing machine, in combination, with a folder, with or without means to turn the stitched material inside out, and including means to receive the stitched material and feed the same from the machine, as well as progressively and continuously pull the material from its source of supply through said folder to and from the needle and, when used, to and from the means for turning the stitched material inside out.

One of the folders contemplated by the instant invention is so designed and constructed that it will fold material passed therethrough about its longitudinal axis and bring the edges thereof in substantially superposed relationship. The thus folded material, due to the construction and location of the folder with respect to the needle, will be presented to the needle for stitching through the superposed portions adjacent the edges thereof. In the preferred form, the folder is provided with means which turn the stitched material inside out. As will hereafter be explained, the direction of travel of the material through the means which turns the stitched material inside out is opposite to the direction of travel of the material to the needle for stitching.

One of the important features of the invention resides in the means and manner of feeding the material through the machine. According to this invention, the material is pulled from its source of supply, caused to pass through the folder and inverting means (when used) by a mechanism which receives the stitched material and feeds it from the machine. It is to be noted that this mechanism is designed primarily for use in machines wherein the usual feed dogs beneath the needle are omitted, though it may be used in conjunction with said feed dogs.

Generally, the mechanism, which feeds the material through the various parts of the machine and from the machine itself, comprises feed dogs and a presser foot cooperating therewith. The feed dogs are, contrary to the usual practice, positioned laterally of and wholly out of the path of travel of the needle of the sewing machine and are appropriately connected to the conventional four-motion feed-actuating mechanism of the machine so that said feed dogs are given a combined horizontal and vertical movement, or alternate horizontal and vertical movements, which is necessary to permit them to function as described. When the apparatus is of the type which turns the stitched material inside out, the feeding means is disposed adjacent the feed-in end of the folder, though as will hereafter appear, it may be disposed at right angles to the longitudinal axis of the folder.

In the preferred form of the invention, the folder and feed dogs and presser foot are appropriately mounted on a support and constitute an attachment for sewing machines which is designed to be secured to a sewing machine. The means for connecting the feed dogs to the driving mechanism of the machine is preferably also made a part of the attachment. In some cases, if desired, the folder may be omitted from the attachment.

It is to be noted that the invention is not restricted to any particular type of sewing machine. It can be used in conjunction with any of the known types.

In order to more fully explain the invention, reference is now made to the accompanying drawings, wherein like reference numerals designate like parts, and wherein the reference numeral 1 designates a base (also sometimes referred to as "cloth plate") of a well-known chain stitch machine carrying a standard 2 and an overhanging frame 3 having a guide 4 through which a reciprocating needle bar 5 reciprocates. The needle bar 5 is appropriately secured to a driving lug 6 and also carries a needle 7. The needle bar 7 cooperates with a guide 8 which is part of the frame 3. A rocker arm 9 is pivotally mounted, as at 10, on the frame 3. At its forward end, the rocker arm 9 is provided with a pivoted link 11 which is appropriately secured to the needle bar 5 or the lug 6, as desired. Thus, when the rocker arm 9 is oscillated about its pivot 10, reciprocal motion will be imparted to the needle bar 5 and hence the needle 7. Oscillation of the rocker arm 9 is secured through the well-known driving mechanism employed for such purposes in known chain stitch machines. The driving means generally comprises a pulley 12 which is driven in any suitable manner and the motion thereof is transmitted to the rocker arm through the eccentric 13 and the ball joint connection 14 secured to the rocker arm 9. The lower end of the rocker arm 9 may also be appropriately connected to the looper (not shown) through the mechanism generally known in the art.

Secured to the base 1 of the machine is a base plate 15 of the attachment. In the form shown, this base plate 15 of the attachment is secured to the base 1 of the machine through screws 16. A folder, generally indicated by the reference numeral 17 and hereinafter more fully explained, is carried by a bracket 18, the latter being provided with slots 19 through which screws 20 pass and secure the same to the base plate 15. By virtue of the slots, the bracket 18, and hence the folder 17, may be adjusted as desired. On the base plate 15, as shown in Figure 2, there is secured, by means of the screws 20', a bracket 21 which carries a stud 22. One end of a spring 23 of approximately the shape and form shown in Figures 3 and 4 is slidably secured to the stud 22 by means of a screw 24 passing through a slot 23'. The spring, at its forward free end, carries a foot 25 which has an upwardly curved toe 26. The base plate 15 is also provided with a block 27 which carries a plate 27' provided with slots through which feed dogs 28, hereinafter more fully described, pass.

Due to the construction just described, the foot 25 cooperates with the feed dogs 28 and, as hereafter explained, the combination feed material passed therebetween. For some purposes it is desired to adjust the height of the presser foot 25 with respect to the feed dogs 28. Therefore, means are provided to accomplish this end. In the form shown, there is provided a lever 29 which is pivotally mounted on a stud 29' on the base plate 15 through a screw 30. The forward end 31 of the lever 29 is adapted to engage the inclined portion 32 of the spring 23. The other end 33 of the lever 29 constitutes a grip element, whereby the lever 29 may be moved about its pivot 30 to raise or lower the presser foot with respect to the plate 27' as desired. It is obvious that other ways of adjusting the height of the foot 25 may be utilized.

The folder 17, in the form shown in Figures 12-17 inclusive, is designed to fold a strip of material passed therethrough so that it will be folded about its longitudinal axis and bring the longitudinal edges in more or less superposed relationship. The body of the folder 17 is appropriately curved and provided with inwardly turned flanges 34 which terminate adjacent the block 35. Cooperating with the folder are means which permit turning the stitched material inside out. In the illustrative form shown, the means for permitting turning the stitched material inside out is a tubular member 36 secured to the forward end of the block 35 and which extends beyond the throat of the folder, as shown in Figures 12 and 13. It is to be noted that the throat or exit end of the folder is located with respect to the needle so as to deliver the folded trimming in proper position and condition for stitching.

At the throat, the folder is provided with a substantially horizontal bottom 37 which is provided with a hole 38 through which the needle passes during the stitching operation. In order to permit the stitching operation, the upper horizontal portion of the throat, and particularly that portion above the hole 38, is cut away as shown by the reference numeral 39. At the feeding end, the folder may be provided with a guide element to facilitate the threading of the material therethrough.

The operations which are performed by the folder are shown in Figures 15-17 inclusive. It is to be noted that as the trimming material 40 is fed through the folders, it is folded about its longitudinal axis so that the opposite edges 41 and 42 are brought in more or less superposed position, as shown in Figure 16. In this condition, the material is fed to the stitching position whereby the needle penetrates the superposed plies adjacent the edge thereof, as shown in Figure 17. After the material is stitched, it is fed beyond the end to the tubular member 36 and then turned rearwardly and passed through said tubular member 36, with the result that the free edges 41 and 42 and stitching are on the inside of the product.

The tubular member may be provided with a hole, recess, or cut-out portion 43 so as to avoid friction with the needle passing thereby, to permit the threading of the stitched material through the inverting member 36. If desired, a part of the peripheral wall of the tubular member may be cut away.

Tension guides 44 are provided in advance of the folder 17 to smooth and flatten the material being fed to the folder. If desired, the tension guides may be secured directly to the folder adjacent its feeding-in end.

The path of travel of the material is through the folder 17 and inverting means 36, as indicated by the arrows in Figure 13. It is to be noted that after stitching, the material is fed through the inverting member 36, as shown by the arrow in Figure 13. The material, after leaving the inverting member 36, passes through the interior of the folder without being acted upon by the folding mechanisms and is withdrawn from the same end as the material is originally fed in, and then passed between the feed dogs 28 and the presser foot 25. For reasons which will become apparent hereafter, the folder 17 is provided with an exit 45 whereby the product produced in the operation may be fed at right angles to the folder.

As previously mentioned, the material is fed through the folder, beneath the needle, through the means for turning the stitched product inside out, and from the machine automatically. In the embodiment of the invention shown in Figures 1–6 inclusive, this is secured by causing the stitched product to pass between the feed dogs 28 and the presser foot 25 cooperating therewith. It is to be noted that the presser foot 25 and the feed dogs 28 are positioned above the cloth plate laterally of the needle 7 and in front of the feed-in end of the folder. In this embodiment of the invention, it is to be noted that there are no feed dogs underneath and in the path of travel of the needle as is the case in the usual type of sewing machine. The feeding of the material through the apparatus is secured through the reciprocal movement of the feed dogs, the feeding being effected when the feed dogs 28 engage the material and cause it to pass in the desired direction.

The mechanism for imparting feeding movement to the dogs will now be described. The feed dogs 28 are appropriately secured as by means of screws to a block 46 carried on one end of the arm 47. The other end of the arm 47 is adjustably secured to the conventional four-motion feed-actuating mechanism of the machine whereby the necessary movement is imparted thereto and hence to the feed dogs 28. Thus, the arm 47 is given combined horizontal and vertical movements which may be resolved as follows: horizontal movement to the right, then a downward movement, next a horizontal movement to the left, and finally an upward movement to the first-named position. The horizontal movements to the right imparted to the feed dogs pull and feed the material through the machine as previously described. With the foregoing in view, said other end of the arm 47 is formed with a downwardly extending portion 49 provided with an elongated slot 50 through which, by means of a screw, it is adjustably secured to a support 48. It is to be noted that the screw cooperating with the slot 50 permits adjustment of the arm 47 as desired. The support 48 is one which, in the usual sewing machines, carries the feed dogs. The support 48 is carried on an arm 51 which is pivotally mounted on a pivot 52 which in turn is connected to an oscillating shaft 53 by means of a link 54. Upon oscillation of the shaft 53, a horizontal reciprocatory movement will be imparted to the arm 51 which will be transmitted to the arm 47. Cooperating with the arm 51 also is means which is adapted to raise and lower said arm, whereby vertical (upward and downward) movements of the arm 47 are produced. In the form shown, this is secured by means of a cam 55 which is mounted on a shaft 56 which is driven through the pulley 12. The cam 55, mounted on the shaft 56, is designed to cooperate with the under surface of the arm 51 and on the top surface of a bracket 57 secured to the arm 51. The cam 55 is of appropriate design so as to impart the desired movements to the arm 51. Thus, upon rotation of the shaft 56, the arm 51 will be moved in accordance with the cam surface to provide the upward and downward movements, and such movements will be imparted to the feed dogs 28 through the arm 47.

On the cam shaft 56 there is provided a sheave 58 which is provided with a slot 59. As shown in Figures 3 and 6, a block 60 is adjustably mounted in the slot 59. The block 60 is secured to the cam mechanism and to one end of an arm 61, the other end thereof being secured to the oscillating shaft 53. Thus, by appropriately positioning the block 60 in the slot 59, the throw of the arm 61 may be adjusted, and hence the longitudinal movements of the arm 51 may be adjusted as desired. It is to be noted that the link joining the block 60 and the arm 61 is pivoted to both.

In the form previously described, the product produced is cylindrical in shape. In such an embodiment, the presser foot 25 is made arcuate in construction, as shown in Figure 5. In the event that a flat product is desired, then the tubular member 36 is made rectangular in cross section and the presser foot is provided with a flat surface, as shown in Figure 5a.

In the foregoing embodiment, the material and product produced therefrom are positively fed through and from the machine by the feed dogs 28. In such an embodiment, the normal and usual feed dogs of a sewing machine are omitted. Such a construction is admirably suitable for the production of a trimming made of relatively thin material, such as cotton, silk, rayon, and the like. It is to be understood that the invention is not restricted to the embodiments previously described. If desired, the principles of the invention may be used in conjunction with a machine provided with the usual feed dogs. Such an embodiment is particularly suitable when the trimming is made of a relatively heavy material. In such an embodiment, the material is fed through a folder which folds the material about its longitudinal axis with the longitudinal edges thereof folded inwardly. In this condition, the material is stitched, the feed dogs beneath the needle aiding to draw the material to the needle. A pulling and feding mechanism constructed in accordance with the principles of this invention is positioned beyond the normal fed dogs and the first-named feed dogs serve to feed the material after stitching by the needle.

An embodiment of the invention such as has just been described in the paragraph immediately preceding is illustrated in Figure 7 of the drawings.

Referring now to Figure 7 of the drawings, the reference numeral 17' designates a folder of a known type which folds the material passed therethrough along its longitudinal axis with the longitudinal edges of the material in-folded and extended in the interior of the material, as shown in Figure 7a. The material in this condition is fed over the feed dogs 62 and beneath the needle, whereby it is stitched in the manner also shown in Figure 7a. The material then passes to a feeding and pulling mechanism disposed laterally of the needle and of the type described above in connection with the previous embodiment. In this embodiment, it is to be noted that the feed dogs 62 are of the usual type. Except for the details explained above and the disposition of the feeding and pulling mechanism as shown in Figure 7, the details of construction of this embodiment are the same as those described in connection with Figures 1 to 6 inclusive. It is understood, of course, that the construction and timing of the four-motion feed-actuating mechanism is such as to permit operation of the machine as described.

The foregoing embodiments have been described in connection with, as previously explained, a known type chain stitch sewing machine. It is to be understood that the invention is not restricted to such a machine. The invention is applicable and can be used in conjunction with any of the other types of machines. Figures 8 to 11 inclusive disclose an embodiment of the invention applied to another type of normal sewing machine.

Figure 8:
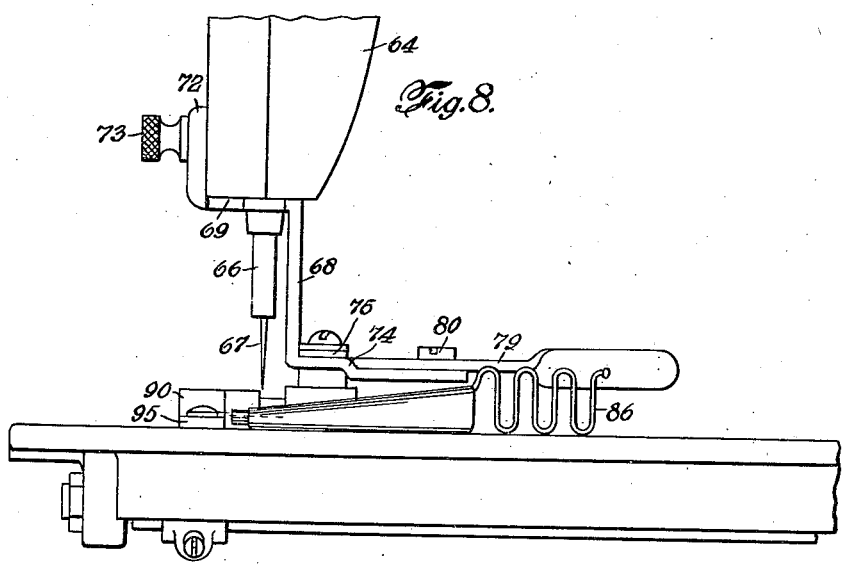
Figure 8 is a front view of another modified form of the invention with the machine head broken away.

Referring now to Figures 8 and 10, the reference numeral 64 designates the head of a Singer sewing machine which is provided with a presser foot bar 65 and a needle bar 66 carrying a needle 67. It is to be noted that in this form of the invention the normal and usual presser foot has been omitted and, if desired, the presser foot bar 65 may also be removed. In its stead there is provided a bracket 68 which is secured to the machine head 64. It is to be noted that the bracket 68 at its upper end is provided with a plate 69 having a hole 70 through which the presser foot bar extends, and also a depression 71 which cooperates with the needle bar 66. It is further to be noted that the plate 69 is provided with an upstanding flange 72 which, by means of a screw 73, is secured to the head 64 of the machine. The lower leg 74 of the bracket 68 has adjustably secured thereto a spring 75 which at its forward end is provided with a presser foot 76 which extends or projects over a slotted member or plate 77 also carried by or integrally formed with the leg 74. The spring 75 and the presser foot 76 may be of the same constructions as those used in the embodiments previously described. The leg 74 of the bracket 68 is provided with an extension 78 on which is pivotally mounted a lever 79, as at 80. The forward end of the lever 79 is adapted to cooperate with the inclined portion of the spring 75. The opposite end of the lever 79 is provided with a gripping element whereby the lever may be moved about its pivot and thereby raising or lowering the presser foot 76.

As will be hereafter more fully described, the feed dogs 82 cooperate with the slotted plate and with the presser foot.

A folder of the type and construction illustrated in Figure 12 is secured to a bracket 83 provided with slots 84, whereby the folder is adjustably secured by screws 85, as indicated in Figure 9. In the form shown, a tension guide 86 is provided adjacent the mouth of the folder. It is to be noted that in this embodiment of the invention the material, after being passed through the folder, stitched and inverted, i. e. turned inside out, is fed from the outlet 45 which is positioned in substantial alignment with the feed dogs 82. In other words, the longitudinal axis of the folder is at right angles to the longitudinal axis of the feed dogs. Manifestly, if desired, the arrangement of the folder may be as described in connection with Figures 1 to 6 inclusive.

The feed dogs 82, in this form of the invention, as in the case of the previous embodiments, are also positioned laterally of the needle 67 and receive the stitched product after it leaves the folder and feed said product from the machine. In addition to the foregoing, the feed dogs 82 serve to pull the material from the source of supply through the folder, to and from the needle, through the inverting means and from the folder.

The feed dogs 82 are secured in an appropriate manner to an arm 90 which is operatively connected to the driving mechanism of the machine and whereby the arm may be continuously and in sequence moved (see Figure 10) to the left, then lowered, moved to the right, then raised to the first-named position during the operation of the machine. In the form shown in Figures 9 and 10, the arm 90 is provided at one end thereof with a block 91 to which the feed dogs 82 are secured by means of screws 92. A leaf spring 93 constituting a cushion is provided on the under surface of the arm 90 to cushion the arm in its vertical movements. The opposite end of the arm 90 is bifurcated and pivotally secured to a block 95 secured to a lever 96 by a pin 97. A spring 98 carried on the block 95 aids in maintaining the arm 90 in proper position.

The lever 96 is pivotally secured to a link 94 which is mounted on an oscillating shaft 99. Thus, when the shaft 99 oscillates, horizontal movement is imparted to the lever 96, which in turn transmits said movement to the arm 90.

For imparting the desired vertical movement to the arm 90 there is provided a lever 100 carrying a pin 101 adapted to engage the under surface of said arm 90. The lever is also appropriately connected, as by being fixed to a link 103 which is adjustably secured, as at 104, to an oscillating shaft 105. By proper adjustment of the link 103 on the shaft 105, the throw of the lever 100 may be adjusted. Upon oscillation of the shaft 105, an upward and downward movement will be imparted to the lever 100.

In the form shown in Figures 10 and 11, the free end of the arm 96 is provided with a pin 106, the free end of which cooperates with a slot 107 in the link 103. By this arrangement, both the horizontal and vertical movements of the arm 90 are coordinated.

From the foregoing description it is apparent that the instant invention provides an apparatus in the form of an attachment which may be quickly and expeditiously attached to a sewing machine, irrespective of its make, and whereby a folded trimming may be produced substantially automatically.

As herein described, the mechanism for feeding the material and product formed therefrom is disposed laterally of the needle and it may be disposed at any position with respect to the folder.

Since it is obvious that various changes and modifications may be made in the above description without departing from the nature or spirit thereof, this invention is not restricted thereto except as set forth in the appended claims.

I claim:

1. In a sewing machine having a conventional four-motion feed-actuating mechanism beneath the cloth plate, a needle to stitch material passed thereunder, a folder in advance of said needle to fold the material about its longitudinal axis and bring the longitudinal edges in substantially superposed relationship and present the thus folded material in position for stitching adjacent the superposed edges, said folder having a tubular member to turn the thus stitched material inside out, the direction of travel through said tubular member being opposite to the direction of travel of the material to the needle, means disposed laterally of and wholly out of the path of travel of the needle and in advance of the feed-in end of said folder through which the material is originally fed to receive the thus turned inside out stitched product and feed it from the machine, said means progressively pulling the material through said folder and feeding the folded material to and away from said needle and through said means to turn the stitched material inside out, said means comprising an arm provided with feed dogs and positioning said feed dogs laterally of and wholly out of the path of travel of said needle and in advance of the feed-in end of said folder, and a spring member mounted on the cloth plate and carrying a presser foot cooperating with said feed dogs, said arm being operatively connected to and actuated by said four-motion feed-actuating mechanism.

2. A sewing machine attachment adapted to be secured to a sewing machine having a conventional four-motion feed-actuating mechanism beneath the cloth plate and comprising a folder adapted to be positioned in advance of the needle of the sewing machine and adapted to fold material passed therethrough about its longitudinal axis and bring the longitudinal edges in substantially superposed relationship and present the thus folded material in position for stitching adjacent the superposed edges, said folder having a tubular member to turn the resulting stitched material inside out, the direction of travel of the material to the needle being opposite to the path of travel of the stitched material through said tubular member, and means adapted to be disposed laterally of and wholly out of the path of travel of the needle and in advance of the feed-in end of said folder to receive the turned inside out stitched product, said means being adapted to be disposed above the cloth plate and comprising an arm provided with feed dogs and positioning said feed dogs laterally of and wholly out of the path of travel of said needle to engage the stitched product, a stud on said cloth plate, a spring member carried by said stud and carrying a presser foot cooperating with said feed dogs, means to adjust said presser foot relative to said feed dogs, said arm being adapted to be connected to the four-motion feed-actuating mechanism of the machine whereby said feed dogs will progressively pull the material through the folder and feed the folded material to and away from said needle, through said means to turn the stitched material inside out, and from the machine.

3. In a sewing machine having a conventional four-motion feed-actuating mechanism beneath the cloth plate, a needle to stitch material passed thereunder, a folder in advance of said needle to fold the material about its longitudinal axis and bring the longitudinal edges in substantially superposed relationship and present the thus folded material in position for stitching adjacent the superposed edges, said folder having a tubular member to turn the thus stitched material inside out, the direction of travel through said tubular member being opposite to the direction of travel of the material to the needle, means disposed laterally of and wholly out of the path of travel of the needle to receive the thus turned inside out stitched product and feed it from the machine, said means also progressively pulling the material through said folder and feeding the folded material to and away from said needle and through said means to turn the stitched material inside out, said means being disposed above the cloth plate and comprising an arm provided with feed dogs and positioning said feed dogs laterally of and wholly out of the path of travel of said needle to engage the stitched product, a spring member mounted on the cloth plate and carrying a presser foot cooperating with said feed dogs, and means to vary the movement of said arm in the horizontal direction, said arm being operatively connected to and actuated by said four-motion feed-actuating mechanism.

4. In a sewing machine having a conventional four-motion feed-actuating mechanism beneath the cloth plate, a needle to stitch material passed thereunder, a folder in advance of said needle to fold the material about its longitudinal axis and bring the longitudinal edges in substantially superposed relationship and present the thus folded material in position for stitching adjacent the superposed edges, said folder having a tubular member to turn the thus stitched material inside out, the direction of travel through said tubular member being opposite to the direction of travel of the material to the needle, means disposed laterally of and wholly out of the path of travel of the needle and in advance of the feed-in end of said folder through which the material is originally fed to receive the thus turned inside out stitched product and feed it from the machine, said means also progressively pulling the material through said folder and feeding the folded material to and away from said needle and through said means to turn the stitched material inside out, said means being disposed above the cloth plate and comprising an arm provided with feed dogs and positioning said feed dogs laterally of and wholly out of the path of travel of said needle and in advance of the feed-in end of said folder to engage the stitched product, a presser foot mounted on the cloth plate and cooperating with said feed dogs, means to adjust said presser foot relative to said feed dogs, and means to vary the movement of said arm in the horizontal direction, said arm being operatively connected to and actuated by said four-motion feed-actuating mechanism.

5. A sewing machine attachment adapted to be secured to a sewing machine having a conventional four-motion feed-actuating mechanism beneath the cloth plate and comprising a base plate adapted to be secured to said cloth plate, a folder on said base plate adapted to be positioned in advance of the needle of the sewing machine and adapted to fold material passed therethrough about its longitudinal axis with the edges in substantially superposed relationship and presenting the thus folded material in position for stitching adjacent the superposed edges, said folder being provided with means adapted to turn the resulting stitched material inside out, means adapted to be disposed laterally of and wholly out of the path of travel of the needle to receive the turned inside out stitched material, said last-named means comprising an arm adapted to extend over the cloth plate and provided with feed dogs adjacent one end thereof, said arm being adapted to position said feed dogs laterally of and wholly out of the path of travel of the needle to engage said stitched product, and a presser foot mounted on said base plate adapted to cooperate with said feed dogs, the other end of said arm being adapted to be connected to the said four-motion feed-actuating mechanism of the machine, whereby said feed dogs will progressively pull the material through the folder and feed the folded material to and away from said needle, through said means to turn the stitched material inside out, and from the machine.

6. A sewing machine attachment adapted to be secured to a sewing machine having a conventional four-motion feed-actuating mechanism beneath the cloth plate and comprising a base plate adapted to be secured to said cloth plate, a folder on said base plate adapted to be positioned in advance of the needle of the sewing machine and to fold material passed therethrough about its longitudinal axis with the edges in substantially superposed relationship and present the thus folded material in position for stitching adjacent the superposed edges, said folder being provided with means adapted to turn the resulting stitched material inside out, means adapted to be disposed laterally of and wholly out of the path of travel of the needle to receive the turned inside out stitched product, said means comprising an arm adapted to extend over the cloth plate and carrying feed dogs adjacent one end thereof, said arm being adapted to position said feed dogs laterally of and wholly out of the path of travel of said needle to engage said stitched product, a presser foot cooperating with said feed dogs and adjustably mounted on the base plate of said attachment, the other end of said arm being adapted to be connected to said four-motion feed-actuating mechanism of the machine, whereby said feed dogs will progressively pull the material through the folder and feed the folded material to and away from said needle, through said means to turn the stitched material inside out, and from the machine.

7. In a sewing machine having a cloth plate and a conventional four-motion feed-actuating mechanism, including a feed bar, beneath the cloth plate, a needle to stitch material passed thereunder, a folder in advance of said needle to fold the material about its longitudinal axis and bring the longitudinal edges in substantially superposed relationship and present the thus folded material in position for stitching adjacent the superposed edges, said folder having a tubular member adjacent one end thereof to turn the thus stitched material inside out, the direction of travel through said tubular member being opposite to the direction of travel of the material to the needle, and means to progressively pull the material through said folder and feed the folded material to and away from said needle and through said means to turn the stitched material inside out, said means comprising feed dogs disposed wholly above the cloth plate and laterally of and wholly out of the path of travel of the needle, an arm extending over said cloth plate and carrying said feed dogs, means attaching said arm to the feed bar of said four-motion feed-actuating mechanism, and a presser foot mounted on said work support to cooperate with said feed dogs, said feed dogs and presser foot being disposed relative to the folder to receive the reversed stitched product as it passes from said folder.

8. In a sewing machine having a cloth plate and a conventional four-motion feed-actuating mechanism, including a feed bar, beneath the cloth plate, a needle to stitch material passed thereunder, a folder in advance of said needle to fold the material about its longitudinal axis and bring the longitudinal edges in substantially superposed relationship and present the thus folded material in position for stitching adjacent the superposed edges, said folder having a tubular member adjacent one end thereof to turn the thus stitched material inside out, the direction of travel through said tubular member being opposite to the direction of travel of the material to the needle, and means to progressively pull the material through said folder and feed the folded material to and away from said needle and through said means to turn the stitched material inside out, said means comprising feed dogs disposed wholly above the cloth plate and laterally of and wholly out of the path of travel of the needle, an arm extending over said cloth plate and carrying said feed dogs, means attaching said arm to the feed bar of said four-motion feed-actuating mechanism, and a presser foot mounted on said work support to cooperate with said feed dogs, said feed dogs and presser foot being disposed in advance of the feed-in end of the folder through which the material is originally fed to receive the reversed stitched product as it passes from said folder.

9. In a sewing machine having a cloth plate and a conventional four-motion feed-actuating mechanism, including a feed bar, beneath the cloth plate, a needle to stitch material passed thereunder, a folder in advance of said needle to fold the material about its longitudinal axis and bring the longitudinal edges in substantially superposed relationship and present the thus folded material in position for stitching adjacent the superposed edges, said folder having a tubular member adjacent one end thereof to turn the thus stitched material inside out, the direction of travel through said tubular member being opposite to the direction of travel of the material to the needle, said folder having means in the side thereof to permit the reversed stitched product to pass from said folder, and means to progressively pull the material through said folder and feed the folded material to and away from said needle and through said means to turn the stitched material inside out, said means comprising feed dogs disposed wholly above the cloth plate and laterally of and wholly out of the path of travel of the needle, an arm extending over said cloth plate and carrying said feed dogs, means attaching said arm to the feed bar of said four-motion feed-actuating mechanism, and a presser foot mounted on said work support to cooperate with said feed dogs, said feed dogs and presser foot being disposed at an angle to said folder in position to receive the reversed stitched product as it passes from said folder.

10. A sewing machine attachment adapted to be secured to a sewing machine having a cloth plate and a conventional four-motion feed-actuating mechanism, including a feed bar, beneath the cloth plate and comprising a base plate adapted to be secured to said cloth plate, a folder on said base plate adapted to be positioned in advance of the needle of the sewing machine and to fold material passed therethrough about its longitudinal axis with the edges in substantially superposed relationship and present the thus folded material in position for stitching adjacent the superposed edges, said folder being provided with a tubular member adapted to turn the resulting stitched material inside out, the direction of travel through said tubular member being opposite to the direction of travel of the material to the needle, and means adapted to progressively pull the material through said folder and feed the folded material to and away from said needle and through said means to turn the stitched material inside out, said means comprising feed dogs adapted to be disposed wholly above the cloth plate and laterally of and wholly out of the path of the needle, an arm adapted to extend over said cloth plate and carry said feed dogs, said arm being adapted to be actuated by said four-motion feed-actuating mechanism and having means to attach said arm to the feed bar of said four-motion feed-actuating mechanism, and a presser foot on said base plate adapted to cooperate with said feed dogs, said feed dogs and presser foot being adapted to be disposed relative to the folder to receive the reversed stitchd product as it passes from said folder.

11. A sewing machine attachment adapted to be secured to a sewing machine having a cloth plate and a conventional four-motion feed-actuating mechanism, including a feed bar, beneath the cloth plate and comprising a base plate adapted to be secured to said cloth plate, a folder on said base plate adapted to be positioned in advance of the needle of the sewing machine and to fold material passed therethrough about its longitudinal axis with the edges in substantially superposed relationship and present the thus folded material in position for stitching adjacent the superposed edges said folder being provided with a tubular member adapted to turn the resulting stitched material inside out, the direction of travel through said tubular member being opposite to the direction of travel of the material to the needle, and means adapted to progressively pull the material through said folder and feed the folded material to and away from said needle and through said means to turn the stitched material inside out, said means comprising feed dogs adapted to be disposed wholly above the cloth plate and laterally of and wholly out of the path of the needle, an arm adapted to extend over said cloth plate and carry said feed dogs, said arm being adapted to be actuated by said four-motion feed-actuating mechanism and having means to attach said arm to the feed bar of said four-motion feed-actuating mechanism, and a presser foot on said base plate adapted to cooperate with said feed dogs, said feed dogs and presser foot being adapted to be disposed in advance of the feed-in end of the folder through which the material is originally fed to receive the reversed stitched product as it passes from said folder.

12. A sewing machine attachment adapted to be secured to a sewing machine having a cloth plate and a conventional four-motion feed-actuating mechanism, including a feed bar, beneath the cloth plate and comprising a base plate adapted to be secured to said cloth plate, a folder on said base plate adapted to be positioned in advance of the needle of the sewing machine and to fold material passed therethrough about its longitudinal axis with the edges in substantially superposed relationship and present the thus folded material in position for stitching adjacent the superposed edges, said folder being provided with a tubular member adapted to turn the resulting stitched material inside out, the direction of travel through said tubular member being opposite to the direction of travel of the material to the needle, said folder having means in the side thereof to permit the reversed stitched product to pass from said folder, and means adapted to progressively pull the material through said folder and feed the folded material to and away from said needle and through said means to turn the stitched material inside out, said means comprising feed dogs adapted to be disposed wholly above the cloth plate and laterally of and wholly out of the path of the needle, an arm adapted to extend over said cloth plate and carry said feed dogs, said arm being adapted to be actuated by said four-motion feed-actuating mechanism and having means to attach said arm to the feed bar of said four-motion feed-actuating mechanism, and a presser foot on said base plate adapted to cooperate with said feed dogs, said feed dogs and presser foot being adapted to be disposed at an angle to said folder in position to receive the reversed stitched product as it passes from said folder.

CHARLES SEAMAN.